Jan. 30, 1934.  W. DUBILIER  1,945,108
POWER FACTOR CONDENSER
Filed Nov. 16, 1929  2 Sheets-Sheet 2
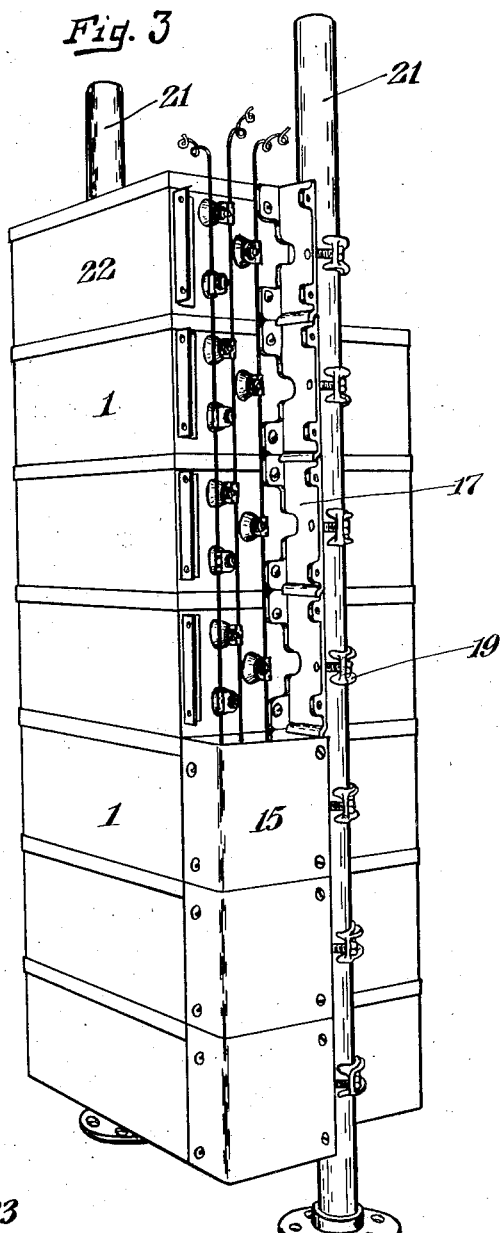
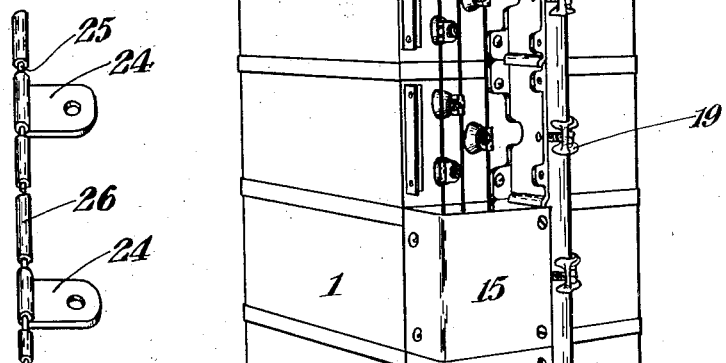
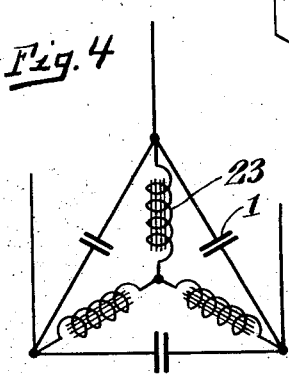
INVENTOR
William Dubilier
BY Edwards, Bower & Poof
ATTORNEYS Patented Jan. 30, 1934

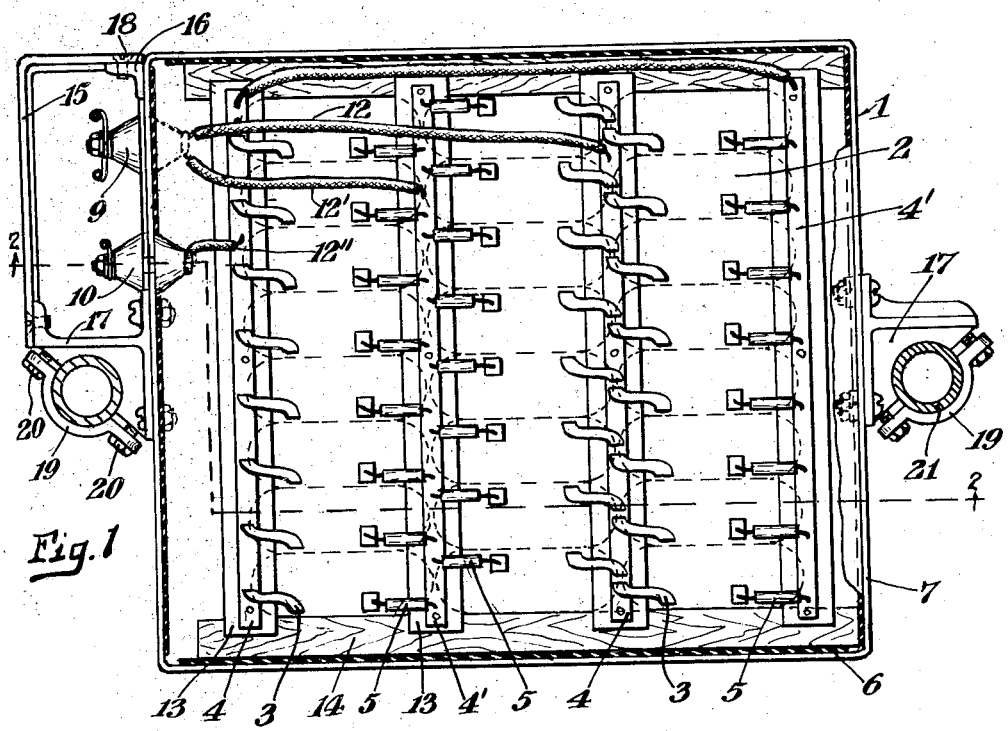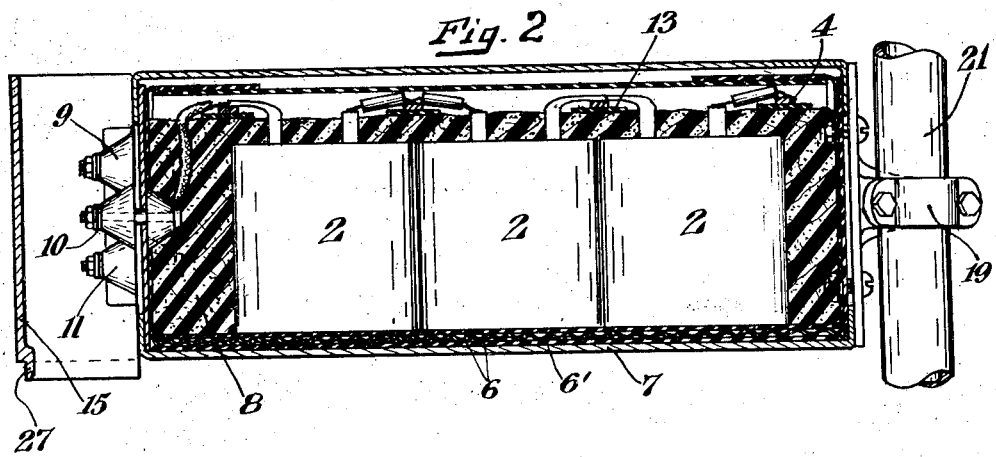

1,945,108

UNITED STATES PATENT OFFICE 1,945,108

POWER FACTOR CONDENSER

William Dubilier, New Rochelle, N. Y., assignor to Dubilier Condenser Corporation, New York, N. Y., a corporation of Delaware Application November 16, 1929
Serial No. 407,587

11 Claims. (Cl. 175—41)

This invention has for its object an improved arrangement in electrical condensers, which is particularly applicable to the type of condenser used for power factor correction purposes.

Another object of this invention contemplates an arrangement for power factor correction by means of static condensers consisting of individual unit condensers, and the structure in which these condensers can be assembled to secure any desired power factor correction by simply adding the correct number of standard units.

The invention also contemplates an arrangement in which such condensers may be mounted in any convenient place where there is available space, without danger of shock from the high voltage circuits with which they may be connected.

The invention also relates to means whereby such condensers may be mounted on standard supporting frame work.

The invention also relates to an arrangement for fusing the various sections of a condenser so as to avoid throwing excessive voltages on any group.

For a complete understanding of my invention, reference will be had to the following description taken in connection with the accompanying drawings, in which Fig. 1 is a plan view of the interior arrangement of one of the condenser units;

Fig. 2 is a section on line 2—2 of Fig. 1;

Fig. 3 shows a number of units mounted on one form of standard frame work in accordance with my invention;

Fig. 4 shows diagrammatically the circuit arrangements of the condensers shown in Fig. 3 when connected to a three phase circuit;

Fig. 5 is a detail of the terminal connections employed.

The use of fixed static condensers for power factor correction purposes presents various advantages over synchronous condensers and other similar devices for correction purposes. One of the important advantages of static condensers is that they may be made in units of varying sizes which may be individually connected to the apparatus whose power factor they are intended to correct. The condenser of the type disclosed may be built up of a number of units to give any desired capacity, and the units may be mounted in any convenient place, preferably close to the apparatus with which they are connected.

It is frequently the case that available space may be had on the supporting framework used for mounting switchboard panels, oil and disconnect switches, and other apparatus used in power circuits. Standard framework, such as the pipe frame shown in Fig. 3, is commonly employed for mounting such apparatus, and the condensers of my invention are adapted to be mounted thereon. This avoids the necessity of providing additional mounting means for the condensers and admits of standardization. It also permits the use of available space on existing installations where it is desired to add condensers for correction or other purposes.

Since the condensers are often used with high voltage circuits, the factor of safety becomes an important one, and I provide means to eliminate the danger of electric shock from accidental contact with the condenser terminals. This means also serves to protect connections or bus conductors to which the condensers are connected.

Referring to Figures 1 and 2, the condenser unit 1 preferably comprises a plurality of condenser sections 2 which are often connected as shown. Conducting leads 3 serve to connect one side of the individual sections to bus bars 4, while individual fuses 5 connect the other side of each of the sections to bus bars 4'. Each of the fuses protects the individual section to which it is connected from external disturbances, and protects the condenser from internal trouble within the section.

Since each of the sections may comprise a number of condensers in series, a single fuse will protect each series group, and this arrangement is desirable since it will not cause surges or other excessive potentials thru any group, as may be the case where the fused condensers are connected in a series-parallel arrangement.

The sections are protected by insulating sheets 6 from the outer casing 7 of the unit. Additional insulating sheets 6' which may be corrugated as shown in Fig. 2 are employed in the bottom of the casing, and the condenser sections are preferably imbedded in an insulating compound 8.

The terminals of each unit are shown at 9, 10 and 11 and are connected to the groups of sections by conductor leads 12, 12' and 12''. The arrangement shown in the drawings is adapted for connection to a three phase or a three wire circuit, but the electrical connection of the sections may be varied in accordance with the type of circuit with which the condenser is used.

The bus bars 4 and 4' are supported by insulating strips 13 which, in turn, may be supported by strips 14 of insulation, or may be supported in any other desired manner.

The terminals 9, 10 and 11 may be of any desired kind suitable for the voltages with which the condenser units are to be used.

In order to enclose and protect the condenser terminals and the line connections thereto, the casing 1 has an extension or housing at one end as shown in Figs. 1, 2 and 3. This extension preferably comprises a removable plate 15 which is secured to the casing by means of angle pieces or brackets 16 and 17. The use of screws 18 permits the ready removal of member 15 for the purpose of connection or inspection. Each of these extensions or housings is open at the top and bottom, and the line conductors may be brought up from below, or may be dropped down from above as shown in Fig. 3.

Angle piece or bracket 17 also serves in combination with clamping ring 19 and bolts 20 as a supporting means for the condenser unit. A similar angle piece is fastened to the opposite end of the casing and comprises the supporting means for that side. This mounting means as shown is adapted for mounting on pipe framework 21, but it is to be understood that the design of the support may be changed for mounting on channel iron, panels or other forms of supports without departing from the spirit of my invention.

Fig. 3 shows a number of my condenser units mounted on pipe framework; the three lower units show the complete casing and illustrate how the terminals and bus leads are enclosed; while the upper units have the plates 15 removed in order to show the manner of making connections. It will be noted that the upper unit 22 in Fig. 3 is only one-half as large as the remaining units. This illustrates the flexibility of my units, that is, units of different sizes may be used interchangeably with the same mounting. Such a unit may also be used to contain the choke coils 23 when the same are used as indicated in Fig. 4.

Fig. 5 shows a detail of the connections made to the condenser terminals in which tabs 24 are soldered to the bus lead 25. Insulating sleeves 26 may be used and spaced in any desired manner.

It will be noted that each unit is individually secured to the frame work 21 and may be positioned to have a slight clearance between it and the adjacent units to facilitate its removal without disturbing the other units. A flange 27 on each member 15, as shown in Fig. 2, provides an interlock or overlap sufficient to bridge the clearance space and thereby prevent entry of foreign matter or objects within the enclosed space formed by members 17, 15 and the walls of the units. The interlocking feature provides, in effect, a continuous conduit system in a bank of units, which system may be readily extended as additional condenser units are required. Since any of the plates 15 may be removed without disturbing the others, this provides, in effect, a conduit system which may be opened at any place for inspection and repair purposes.

A bank of my condensers may be installed, or added to as the demand requires, without disturbing existing apparatus or installations, and any of the condensers may be removed for repair or other purposes without disturbing the bank. The design of the units also permits standardization of equipment with resulting lower cost and conservation of space. It will be noted that the parts of the condenser units are held together by bolts or screws and may, therefore, be easily removed or replaced.

I claim:

1. An electrical condenser comprising a casing, condenser sections within the casing, said casing having an extending portion for enclosing the terminals of the condenser, and an opening in the extending portion for connection to an external circuit, said extending portion also comprising mounting means for the condenser.

2. An electrical condenser comprising a casing, a plurality of condenser sections within the casing, the latter having an extension at one end for enclosing the terminals of the condenser, and an opening in each end of the extension to permit an external lead-in from different directions, said extension also comprising means for mounting the condenser on supporting switchboard framework.

3. An electrical condenser comprising a casing, a plurality of condenser sections within the casing, said casing having an extension at one end thereof for enclosing the terminals of the condenser, said extension having means for supporting the condenser, and an opening in the opposite ends of the extension to permit an external lead-in from opposite directions.

4. An electrical condenser comprising a casing, condenser sections within the casing, the casing having an extension for enclosing the terminals of the condenser, said extension having a removable portion to permit connection or inspection of the terminals, the extension also having oppositely disposed openings to permit an external lead-in from different directions, said extension also including means for mounting the condenser.

5. An electrical condenser comprising a casing, condenser sections within the casing, the latter having an extension at one end for enclosing the terminals of the condenser, one side of the extension comprising a means for mounting the condenser, another side of the extension comprising a removable portion to give access to the condenser terminals, the extension having oppositely disposed openings to permit an external lead-in from different directions, and additional mounting means at the other end of the casing.

6. An electrical condenser comprising a casing, condenser sections within the casing, terminals mounted in the wall of the casing for connection to an external circuit, an extension from said wall for enclosing the terminals, one side of the extension comprising a means for mounting the condenser, another side of the extension comprising a removable plate to give access to the condenser terminals, the extension having oppositely disposed openings to permit an external lead-in from different directions, the extension wall defining one of said openings having a flanged portion adapted to interlock with the extension of an adjacent condenser.

7. An electrical condenser comprising a plurality of condenser sections within an enclosing casing, the casing having an extension at one end for enclosing the terminals of the condenser, the extension being provided with a removable portion to give access to the condenser terminals, and having oppositely disposed openings to permit an external lead-in from different directions, the extension having clamping means and the other end of the condenser casing having additional clamping means for mounting the condenser on supporting switchboard framework.

8. An electrical condenser comprising condenser sections embedded in an insulating compound within an enclosing casing, terminals mounted in the wall of the casing for connection to an external circuit, an extension from said wall for enclosing the terminals; a side of the extension being provided with a removable plate to give access to the condenser terminals, the extension having oppositely disposed openings to permit an external lead-in from opposite directions, the wall defining said openings having a flanged portion adapted to interlock with the extension of an adjacent condenser, one side of the extension having means and the condenser casing having additional means for clamping the same to supporting switchboard framework.

9. A condenser comprising a framework and condenser units adapted to be secured to said framework in closely adjacent relation, each condenser unit comprising a metal casing, a plurality of condenser sections within said casing, terminals extending from a wall of said casing and connected to said condenser sections, supports extending from said casing and engaging said framework, and means carried by the casing and protecting the terminals thereof, said means being adapted to form, in combination with like means carried by the other units, a protective enclosure for said terminals.

10. A condenser comprising a framework and unit condensers adapted to be secured to said framework in closely adjacent relation, each unit condenser comprising a metal casing, a plurality of condenser sections within said casing, terminals extending from a wall of said casing and connected to said condenser sections, supporting brackets on opposite sides of said casing adapted to engage said framework, and means cooperating with one of said brackets for protecting said terminals.

11. An electrical condenser structure comprising a casing and a condenser therein, said casing having condenser terminals and an enclosure therefor having a projection offset to interlock with the enclosure of a like adjacent casing; said casing having a bracket adapted, with the brackets of like casings, to secure together the said casings and their terminal enclosures and thereby form a unitary structure.

WILLIAM DUBILIER.